US010296926B2

(12) United States Patent
Hawkins et al.

(10) Patent No.: US 10,296,926 B2
(45) Date of Patent: May 21, 2019

(54) SECONDARY MARKET INTEGRATION WITHIN EXISTING DATA FRAMEWORK

(71) Applicant: Accenture Global Services Limited, Dublin (IE)

(72) Inventors: Christopher John Hawkins, San Jose, CA (US); Leeann Chau Tuyet Dang, Santa Clara, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 811 days.

(21) Appl. No.: 14/920,687

(22) Filed: Oct. 22, 2015

(65) Prior Publication Data
US 2017/0116619 A1   Apr. 27, 2017

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0201* (2013.01); *G06Q 30/0601* (2013.01)

(58) Field of Classification Search
None
See application file for complete search history.

(56) References Cited

U.S. PATENT DOCUMENTS

| 7,702,545 | B1 | 4/2010 | Crompton et al. | |
| 9,424,599 | B2 * | 8/2016 | Acosta | G06Q 30/0261 |
| 2008/0109234 | A1 * | 5/2008 | Leach | G06Q 10/02 |
| | | | | 705/37 |
| 2009/0254861 | A1 * | 10/2009 | Seetharamakrishnan | |
| | | | | G11B 27/34 |
| | | | | 715/810 |
| 2011/0238497 | A1 | 9/2011 | Milne et al. | |
| 2011/0295705 | A1 * | 12/2011 | Kasmei | G06Q 20/105 |
| | | | | 705/16 |
| 2013/0246255 | A1 * | 9/2013 | Pernice | G06Q 20/085 |
| | | | | 705/39 |
| 2014/0316946 | A1 * | 10/2014 | Sanders | G06Q 30/0625 |
| | | | | 705/26.62 |

(Continued)

FOREIGN PATENT DOCUMENTS

| WO | WO 00/58895 | 10/2000 |
| WO | WO 2001/095208 A1 | 12/2001 |

OTHER PUBLICATIONS

Canadian Office Action, dated Feb. 5, 2018, pp. 1-7, issued in Canadian Patent Application No. 2,942,696, Canadian Intellectual Property Office, Gatineau, Quebec, Canada.

(Continued)

*Primary Examiner* — Mila Airapetian
(74) *Attorney, Agent, or Firm* — Brinks Gilson & Lione

(57) ABSTRACT

A system and method retrieve a robust customer profile of a user accessing a website and generate a custom webpage that include in a first area graphical user interface elements and objects representative of products owned by a first entity having stored attributes that correlate with attributes of the user stored in the robust customer profile. A state of a secondary market is determined and the custom webpage is generated to include in a second area graphical user interface elements and objects representative of items owned by a second entity in the secondary market that correlate with the products in the first area.

12 Claims, 6 Drawing Sheets

(56) References Cited

U.S. PATENT DOCUMENTS

2016/0055499 A1    2/2016   Hawkins et al.
2016/0260031 A1*  9/2016   Pace ..................... G06Q 10/02
2017/0061509 A1*  3/2017   Rosenberg ......... G06Q 30/0601

OTHER PUBLICATIONS

User-ID: Measuring Real Users Instead of Devices, Schroder, dated Aug. 13, 2015, pp. 1-16, obtained from the internet on Feb. 23, 2018 from: < https://www.lunametrics.com/blog/2015/08/13/user-id-measuring-real-users/>.
Australian Examination Report No. 1, dated Nov. 11, 2016, pp. 1-6, issued in Australian Patent Application No. 2016231575, Offices of IP Australia, Woden, ACT, Australia.
Australian Examination Report No. 2, dated May 22, 2017, pp. 1-3, issued in Australian Patent Application No. 2016231575, Offices of IP Australia, Woden, ACT, Australia.
Canadian Office Action, dated May 29, 2017, pp. 1-3, issued in Canadian Patent Application No. 2,942,696, Canadian Intellectual Property Office, Gatineau, Quebec, Canada.
Australian Examination Report No. 3, dated Sep. 20, 2017, pp. 1-3, issued in Australia Patent Application No. 2016231575, Offices of IP Australia, Woden, ACT, Australia.
Australian Examination Report No. 4, dated Nov. 13, 2017, pp. 1-4, issued in Australia Patent Application No. 2016231575, Offices of IP Australia, Woden, ACT, Australia.

\* cited by examiner

SECONDARY MARKET INTEGRATION WITHIN EXISTING DATA FRAMEWORK

BACKGROUND

In most customer interactions, a customer may be faced with various barriers, or elements of friction, that may prevent them from proceeding with the interaction, where the particular barriers may vary from interaction to interaction. In the context of a purchase transaction, for example, customers may wonder if they can afford to make the purchase, or whether they need to make the purchase. For instance, a customer looking to purchase a pair of designer jeans may assess whether they can afford the purchase based on their budget or determine whether they have enough space in their wardrobe. Customers may also face mental barriers regarding a transaction, for example, "shopping guilt" or for those customers who are environmentally conscious, questions regarding the sustainability of the product. It is often the case that the mental barriers are subjective in nature, and may be influenced by various externalities. For example, a customer may assess whether they truly have a need for a product, or whether they strongly desire the product. This assessment may involve additional subjective considerations, for example whether the customer owns the same or similar products. By removing these barriers, customers are more likely to engage in the interaction (i.e., proceed with the purchase transaction). For example, if a product is on sale, a customer may be more inclined to make the purchase.

Customers have turned to secondary markets to address some of these barriers, as secondary markets can allow a customer to off-load or sell certain items. By way of example, a customer can sell a coat that he/she owns, which can provide additional funds to the customer as well as free up space in their wardrobe. Increasing a customer's purchasing power may influence whether the customer is able or willing to conduct future transactions, e.g., additional purchases. Similarly, a customer may choose to purchase an item from a secondary market because it is being offered at a significant discount.

However, secondary markets themselves present barriers to access, as it is often time and labor intensive process to participate in the market, which most customers are simply unwilling or unable to commit to. For example, participating in flea markets is a time consuming activity and has no guarantee of success. This is particularly problematic for customers who are only looking to off-load one or two individual items. While electronic secondary markets (e.g., eBay and Amazon) allow for more sporadic access to secondary markets, they still require a significant amount of effort on the part of the customer, who must prepare a detailed product listing for the product, including a description, staged photos, and the like. Moreover, existing electronic secondary markets are difficult to navigate by potential purchasers looking for a particular product, significantly diminishing the chances for a successful transaction. Furthermore, from the perspective of a product retailer, secondary markets can be extremely harmful to product branding, as the product retailer has no control over how products are presented (e.g., visually or descriptively) through these secondary markets.

DETAILED DESCRIPTION

Figure 1:
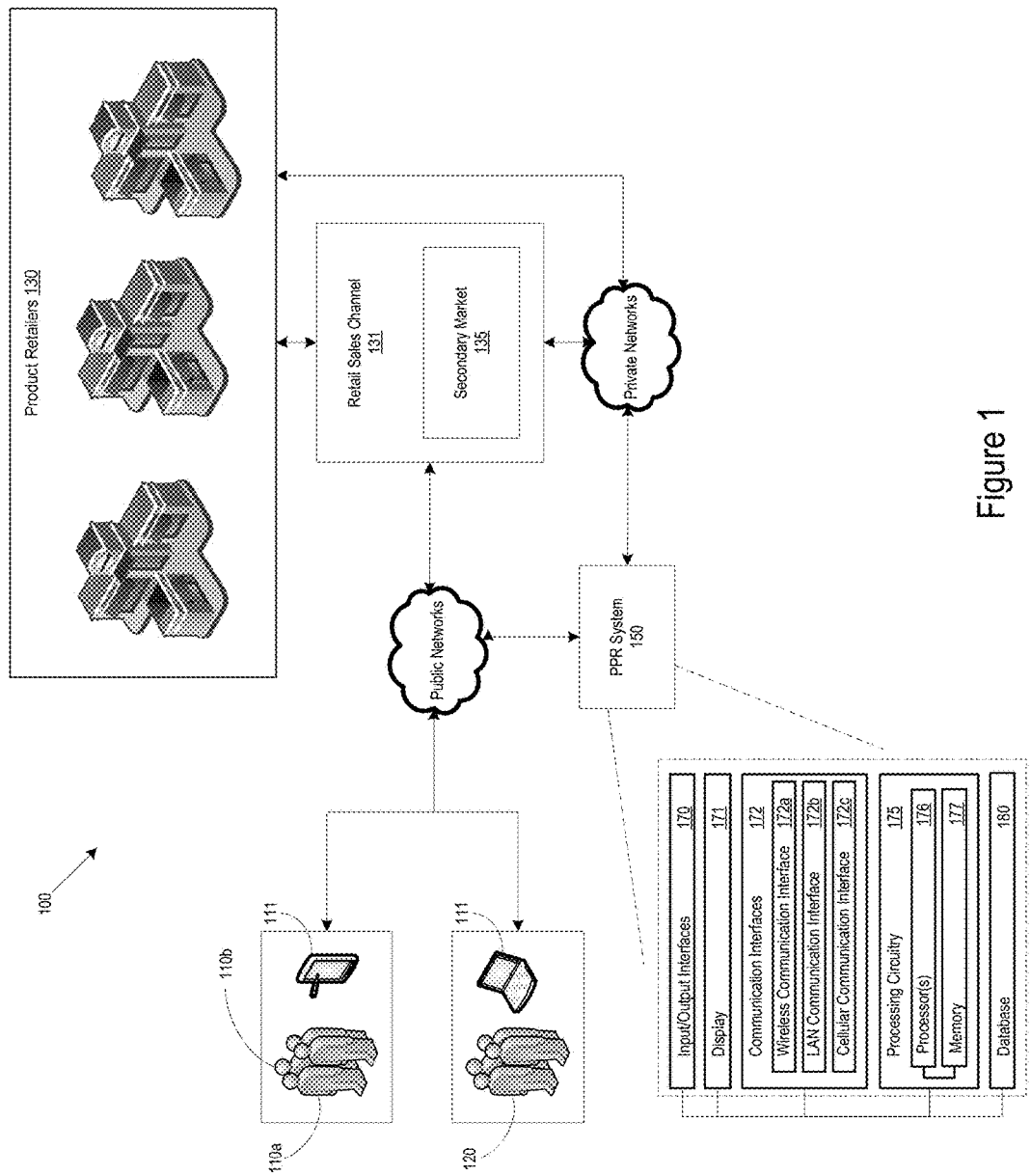
FIG. 1 provides an example of the system environment in which the PPR system may operate.

The Peer-to-Peer Resale (PPR) system described below aims to reduce barriers in customer transactions by providing a platform through which a customer can interact with secondary markets. The PPR system, for example, may provide a way for customers to sell, or otherwise offload, products to secondary markets, which may increase the customer's purchasing power. The customer (i.e., a market participant) may be able to place items on the secondary market in exchange for currency, credit with a product retailer, or some combination thereof, which may be stored in a data record associated with the customer in the PPR system or transmitted to other systems for the customer's use. In contrast to current secondary markets, the PPR system may facilitate sales to the secondary market through integration with existing retail channels of a product retailer. A retailer, for example, may integrate the secondary market into their e-commerce platform. By integrating the secondary market within an existing sales channel, the customer may be able to establish a brand connection in the secondary market that they would not otherwise be able to create. Providing the secondary market through an existing sales channel of the product retailer, may also increase the likelihood of a successful sale in the secondary market, as customers looking to purchase the product from the secondary market may be more readily able to locate products of interest to them. From a product retailer's perspective, this may allow the product retailer to control the sales experience in the secondary market in ways in which they are currently unable to. The PPR system, for example, may allow product retailers to better control the branding of their products in the secondary market (e.g., through the presentation of the product on the retailer's e-commerce platform).

The PPR system may also facilitate an effortless sales experience for the customer, allowing them to easily place items on the secondary market. The PPR system may leverage information that a product retailer may have regarding the customer in doing so. For example, the PPR system may create a virtual product inventory for a customer based on previous transactions that the customer may have had with the product retailer, and may allow the user to select items from the virtual inventory to sell on the secondary market. The PPR system may automatically generate a product listing based on the selected item, which may be curated in in a manner proscribed by the product retailer, and may place the product listing on the secondary market integrated within the product retailer's existing sales channel.

By integrating the secondary market within a sales channel of the product retailer, the product retailer may be able to capture transactions in secondary markets that would otherwise take place outside of their retail ecosystem. This may provide additional opportunities for customer engagement, which the product retailer may use to cross-sell or up-sell their retail products. The product retailer may also be able to control the sales experience in the secondary market for the customer, allowing the retailer to better engage with their customers. The PPR system, for example, may promote discovery of new items by the customer, and may provide a social aspect, through a social platform, to facilitate this discovery.

FIG. 1 provides an example of the system environment in which the PPR system may operate.

The PPR system environment may include various customers 110 (e.g., customers looking to sell products, referred to as sellers 110a, and customers looking to purchase products, referred to as purchasers 110b), social influencers 120, and product retailers 130, along with a PPR system 150 that may facilitate interaction between these different entities. The PPR system may facilitate interaction between different customers 110, or between a customer 110 and a social influencer 120. The PPR system may also promote interaction between the different customers 110 and the product retailers 130.

The PPR system 150 may include one or more input/output interfaces 170, a display 171, one or more communication interfaces 172, and processing circuitry 175. The processing circuitry 175 may include one or more processors 176, memory 177 and may be connected with one or more databases 180. The communication interfaces 172 may include, as examples, a wireless communication interface 172a, a wired communication interface 172b, and a cellular communication interface 172c, any of which may support connectivity over any type of network (e.g., WiFi, 4G/LTE, or Ethernet) for receiving data and transmitting data. The PPR system 150 may receive and transmit data between the different customers 110, social influencers 120 and product retailers 130 over both private networks (e.g., a network within a given enterprise) and public networks (e.g., including the Internet). The PPR system 150 may interface with an existing retail sales channel 131 of the product retailer 130, for example, an e-commerce website maintained by the product retailer 130, and may facilitate the integration of a secondary market 135 within the existing sales channel 131.

By way of example, in the context of clothing sales, the PPR system may be used to provide a secondary market 135 for customers 110 in which the customers 110 may be able to purchase and sell clothing and other accessories. A customer's purchasing habits may be driven by their own unique style (e.g., bohemian, grunge chic, preppy), which may be constantly evolving and may be heavily influenced by trends in the fashion world. In the fashion community, for example, individual stylists and fashion bloggers (i.e., social influencers 120) may provide inspiration to these customers by creating different "styled looks" or outfits that customers may wish to replicate for themselves. In many instances, the customer 110 may be willing to purchase the different elements of the outfit directly from a fashion retailer 110 at retail prices. In other cases, customers 110 may turn to secondary markets to make such purchases.

For example, some customers 110 may be price conscious and may be looking to purchase the look at a discount. The PPR system 150 may facilitate this interaction by connecting purchasers 110b with sellers 110a or with social influencers 120 who are looking to sell certain products. A seller 110a, for example, may have purchased an item of clothing but never worn it, or have only worn it to a particular event, and now may want to sell the product to make additional room in their wardrobe. Similarly, a fashion blogger may have purchased clothes to style and photograph a particular look, and may be willing to sell the product at a discount. In another scenario, it may be the case that a product is difficult to obtain, for example, if the product is currently out of season or if the social influencer 120 has exclusive access to a product. In such situations a purchaser 110b may be willing to purchase the product directly from other sellers 110a or from the social influencer 120, respectively, and may even be willing to pay a premium for the product.

While the subsequent discussion may make continued reference to the above-described clothing sale example, the invention is not thus limited and may naturally extend to other products and contexts. For example, in other implementations, the PPR system may serve to connect consumers of video games (i.e., customers 110) with professional gamers (i.e., social influencers 120) and video game retailers or video game studios (i.e., product retailers 130).

As noted above, the interaction between customers 110, social influencers 120 and product retailers 130 may take place within a secondary market 135 integrated within an existing sales channel 131 of the product retailer 130 by the PPR system 150. Customers 110, for example, may be able to access the secondary market 135 through an e-commerce website or mobile application (i.e., sales channel 131) of the product retailer 130. Social influencers 120, likewise, may be able to present curated product descriptions (i.e., a combined product listing) through the e-commerce website or mobile application, and may choose to list one or more of the products present in the curated product description on the secondary market 135 as well. The product retailers 130, through the PPR system 150, may be able to control various aspects of these customer interactions, and may also be able to directly interact with the customers 110 themselves.

Figure 2:
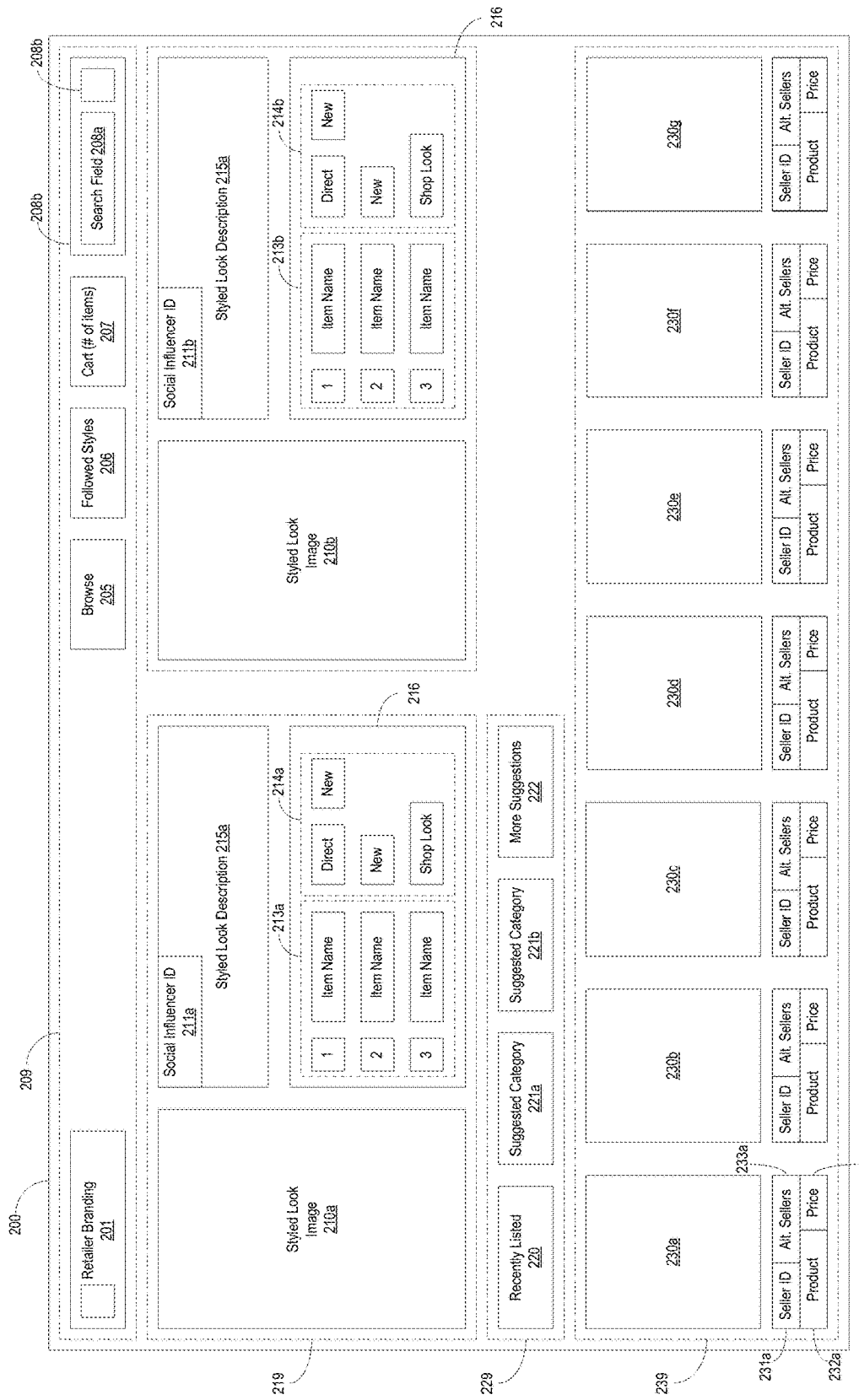
FIG. 2 provides an example of an e-commerce website having connections with the secondary market integrated therein.

FIG. 2 illustrates an example of a sales channel 131 of a product retailer 130, in the form of an e-commerce website, with connections to the secondary market 135 integrated therein. The e-commerce website may present a graphical interface 200 to a customer 110 with which a customer 110 may interact. FIG. 2 illustrates an example of a home page of an e-commerce site provided by a product retailer 130. The graphical interface may include a site navigation bar 209, one or more curated product description areas 219, a secondary market navigation bar 229, and a secondary market listing area 239.

The site navigation bar 209 may include various elements that a customer 110 may interact with. As illustrated, for example, the site navigation bar 209 may provide a browse element 205, a followed styles element 206, and a shopping cart element 207. The site navigation bar may also include a search element 208, and a home page element 201. The navigation bar 209 may be provided as part of one or more pages that the customer 110 may navigate to on the e-commerce website, and the home page element 201, when selected by the customer 110 may return the customer 110 to the home page of the e-commerce site shown in FIG. 2.

The browse element 205, when selected by the customer 110, may direct the customer 110 to information regarding products offered by the product retailer 130. Additionally, or in the alternative, the browse element 205 may direct the customer 110 to recommended products, which the PPR system 150 may identify based on a robust customer profile (also referred to as a customer genome), which may provide an indication as to the product preferences of a user (e.g., size, color, style). The PPR system 150 for instance may be able to match product attributes of the products offered by the product retailer 130 to the product preferences provided by the customer genome. The customer genome and systems and methods for constructing and applying the customer genome are described in U.S. application Ser. No. 14/835,187, filed Aug. 25, 2015, entitled SYSTEM ARCHITECTURE FOR CUSTOMER GENOME CONSTRUCTION AND ANALYSIS, which is commonly assigned and incorporated herein by reference in its entirety.

In some implementations, the browse element 205, when selected by the customer 110, may direct the customer 110 to information regarding the different social influencers 120 who have chosen to present curated product descriptions (e.g., styled looks) and/or list one or more corresponding products on the secondary market 135 integrated within the sales channel 131 of the product retailer 130. The product retailer 130, through the PPR system 150, may control which social influencers 120 enroll with the product retailer 130 to present curated product descriptions on the sales channel and/or list corresponding products on the secondary market 135. The product retailer 130, for example, may allow any social influencer 120 to enroll with the product retailer 130 to present curated product descriptions and/or list products on the integrated secondary market 135. In other cases, the product retailer 130 may choose to selectively control the type of social influencers 120 who may be able to enroll with the product retailer 130, for example, only allowing social influencers 120 who meet certain criteria (e.g., having a certain number of Facebook, Instagram, or YouTube followers) to enroll with the product retailer 130, which may allow the product retailer 130 to maintain a quality standard for the platform. The browse element 205 may additionally, or in the alternative, direct the customer 110 to information regarding social influencers 120 that the PPR system 150 may recommend for the customer 110, who the PPR system may identify using the customer genome. The PPR system 150, for example, may be able to match a product preference (e.g., a style preference) for the customer 110, provided by the customer genome, to one or more tags (e.g., runway fashion, avante garde, grunge chic) associated with a social influencer 120 or one or more tags associated with a curated product description created by the social influencer 120.

In other implementations, the browse element 205, when selected by the customer 110, may direct the customer 110 to information regarding different curated product descriptions (e.g., styled looks) that have been created by social influencers 120 or the product retailer 130 itself. In some implementations, the PPR system 150 may direct the customer 110 to information regarding recommend curated product descriptions (e.g., recommended styled looks), which the PPR system 150 may select using the customer genome. The PPR system 150, for example, may be able to match a product preference (e.g., a style preference) for the customer 110, provided by the customer genome, to one or more tags associated with the curated product description.

The followed styles element 206, when selected by the customer 110, may provide the customer 110 with a listing of the different social influencers 120 that the customer 110 may be following. Customers 110 may follow social influencers 120 in a variety of ways, and may be assisted by the PPR system 150 in doing so. For example, the customer 110 may be able to select different social influencers 120 to follow when browsing information regarding the different social influencers 120, as described above. The PPR system 150 may also use the customer genome to automatically identify social influencers 120 who the customer 110 may wish to follow. The customer genome, for example, may identify social influencers 120 that the customer 110 is following on external social networks (e.g., Facebook, Instagram, Pinterest), and the PPR system 150 may look to see if the identified social influencers 120 have enrolled to present curated product descriptions with the product retailer 130. The PPR system 150 may be configured to automatically follow social influencers 120 for a customer 110, who may be identified using the customer genome, and may allow the customer 110 to modify this after the fact. For example, as noted above, the customer genome may identify social influencers 120 that the customer 110 is following on external social networks.

In some implementations, the customer 110 may be able to follow certain product categories (e.g., preppy or grunge chic), and the PPR system 150 may identify curated product descriptions created by the product retailer 130 or social influencers 120 by matching the product categories against the curated product descriptions. The PPR system 150 may also be configured to automatically follow product categories for a customer 110, which may be identified using the customer genome, and may allow the customer 110 to modify this after the fact. The customer genome, for example, may be able to examine the transactional history of the customer 110 to determine product category preferences. For instance, determining that the customer 110 is interested in spring dresses based on the seasonal purchase of dresses in the past.

The shopping cart element 207, when selected by the customer, may direct the customer to a virtual shopping cart, which may include products that the customer 110 has chosen to purchase from the product retailer 130 or from other sellers 110a and social influencers 120 via the secondary market 135. The search element 208 may allow the user to search the product retailer's 130 e-commerce website for different products and styles, or curated product descriptions and social influencers by entering search terms in the search field element 208a and selecting the search button element 208b.

The curated product description areas 219 may present a purchaser 110b with curated product descriptions that have been created by a social influencer 120 or by the product retailer 130, and may enable the purchaser 110b to purchase one or more products featured in the curated product description. The curated product description areas 219 may be displayed with a consistent presentation (e.g., having a common layout), which may include an image of the one or more the products 210, relevant information regarding the one or more products 215, and a listing of the one or more products 216 contained within the curated product description. The image of the one or more products 210 may be created by the social influencer 120 or product retailer 130, and may present a visually appealing presentation of a product. In this way, the product retailer 130 may be able to control branding of their products on the secondary market 135. The relevant information regarding the one or more products 215 may similarly be prepared by the social influencer 120 or the product retailer 130, and may provide relevant information regarding the one or more products and may describe them in an engaging way. The relevant information 215 may also include a social influencer identification element 211, which identifies the social influencer 120 (e.g., Rachel Zoe, Kemal Harris) who has created the curated product description. The product listing 216 may list each of the products in the curated product description along with corresponding product names 213, and may present the purchaser 110b with different purchase options 214. The purchaser 110b, for example, may be able to purchase a product directly from the social influencer 120 associated with the product listing by selecting the "Direct" interface element, or purchase the product new from the product retailer 130 by selecting the "New" interface element. In some instances, a particular product identified in the curated product description may not be available from either the social influencer 120 or the product retailer 130. In such cases, the purchaser 110b may be able to select the "Shop Look" interface element, which may present the purchaser 110b with products available directly from the product retailer 130 or from other sellers 110a or social influencers 120 on the secondary market 135 that are similar (e.g., having the same color and style) to the product presented in the curated product description.

The curated product description areas 219 that are presented as part of the home page may be automatically selected by the PPR system. The PPR system 150 may select particular curated product descriptions 219 based on input from the product retailer 130 (e.g., to promote certain products), or by using the customer genome. The PPR system, for example, may be able to match a product preference of the customer 110, provided by the customer genome, to one or more tags associated with the curated product description.

The home page may also display products that have been listed on the secondary market in a secondary market listing area 239, and may include a secondary market navigation bar 229 that allows customers 110 to navigate the secondary market 135.

The market listing area 239 may provide listings for individual products that are listed on the market. For each individual listing, an image element 230a-g for the product may be displayed along with relevant information for the product listing, including a product name element 232a, providing the product name, a listing price element 234a, providing the listing price, and a seller ID element 231a, providing the seller's name, on-line handle (e.g., "fashionista22") or identification number. A purchaser 110b visiting the website may be able to select the product image element 230a or the relevant information (i.e., the product name element 232a, listing price element 234a, or seller ID element 231). The product image element 230a, product name element 232a, and listing price element 234a, when selected by the customer 110, may direct the purchaser 110b to a more detailed product listing page, or add the product listing to the purchaser's virtual shopping cart. The seller ID element 231, when selected by the customer 110, may direct the purchaser 110b to a page containing information regarding the seller 110a (or social influencer 120), for example, presenting all products that the seller 110a (or social influencer 120) has listed.

The individual product listing may also provide an alternative sellers element 233a, which when selected by the customer, may present the customer 110 with product listings for the product that are available from other sellers 110a on the secondary market 135 or directly from the product retailer 130. In some implementations, the PPR system 150, in identifying alternate sellers 110a of the product, may be able to leverage a product data platform of the product retailer 130, which may allow for better identification and aggregation of closely related products that the purchaser 110b may be interested in. For example, products that are described by a stock keeping unit (SKU) may identify a specific product, but may not be used to identify related products in a product family. As a more specific example, a SKU may identify a particular shirt having a particular style, color, size, but does not capture the same shirt in a different color or different size. By using the product data platform of the product retailer 130, which may provide product data and retail taxonomy information, the PPR system 150 may be able to identify closely related products (e.g., products in the product family), for example, identifying shirts having the same style but available in a different color or size. In this way, the PPR system 150 may allow a purchaser 110b to more easily and effectively locate the product that they are looking to purchase, when compared to traditional secondary markets. For instance, in the clothing example, customers may have a preference for a particular size, or may wish to find the shirt in a more flattering color. The ability to automatically identify and group these closely related products can increase the likelihood of sales, as the PPR system is able to present the customer 110 with what they are looking for without the customer 110 having to browse the entire secondary market 135. It may also promote direct sales from the product retailer 130, as the customer 110 is able to purchase the product that they are looking for directly from the product retailer 130 when it may not be available on the secondary market 135 (e.g., when the secondary market 135 does not have a dress in the customer's size).

As mentioned above, the website may also provide a secondary market navigation bar 229 that may allow the customer 110 to navigate the secondary market 135. The navigation bar 229, for example, may provide a recent listings element 220, suggested category elements 221a-b, and a more suggestions element 222.

The recent listing element 220, when selected by the customer 110, may filter or adjust the listings provided in the secondary market listing area 239 to display those products that have been listed most recently on the secondary market 135 or within a certain time period (e.g., past few hours). For instance, the customer 110 may be able to filter the listings to show those listings on the secondary market 135 that have been listed within the past 24 hours or the last ten product listings.

The suggested category elements 221a-b, when selected by the customer 110, may filter or adjust the listings provided in the secondary market listing area 239 to display those products listed on the secondary market 135 that fall within a particular product category. The more suggestions element 222, when selected by the customer 110, may provide the customer 110 with additional filter elements for additional suggested product categories. The suggested product categories may be specified by the product retailer 130 or may be determined by the PPR system 150, using the customer genome, which may provide product categories that are of greatest interest to the customer 110.

Figure 3:
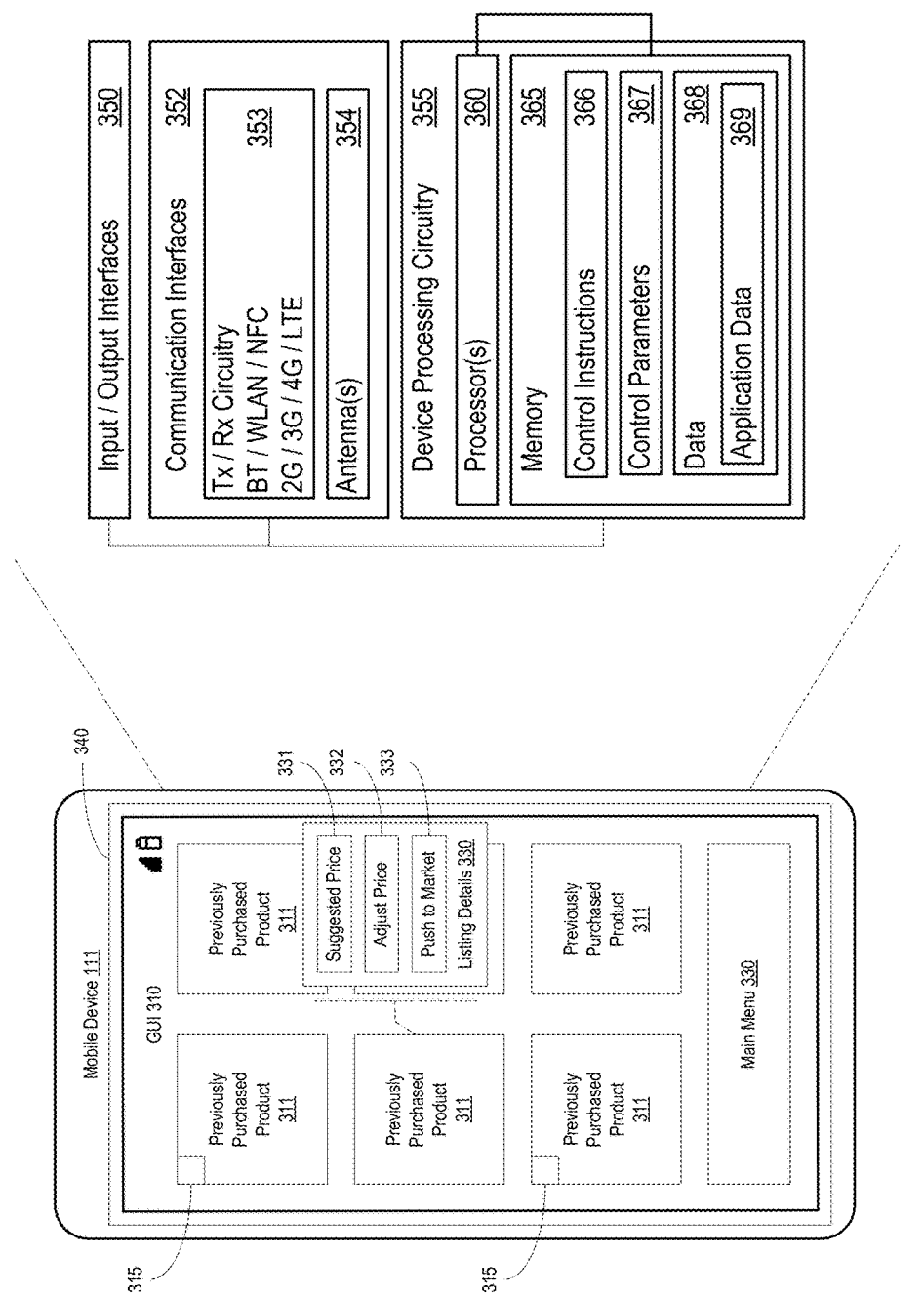
FIG. 3 illustrates an example of a user interface that may be provided on the mobile device of a customer FIG. 4 provides an example of the system architecture on which the PPR system may be implemented.

FIG. 3 illustrates an example of a mobile device 111 that the customer 110 may use to place items for sale on the secondary market 135. The mobile device 111 may include a display 340, input/output interfaces 350, communication interfaces 352, and device processing circuitry 355. The input/output (I/O) interfaces 350 may include a touch sensitive display, voice or facial recognition inputs, video and still image cameras, temperature sensors, vibration sensors, rotation and orientation sensors, buttons, switches, speakers and other interface elements. The device processing circuitry 355 may be used to implement any of the desired functionality of the mobile device 111. The device processing circuitry 355 may include any combination of hardware, software, firmware, or other logic, and may be implemented, for example, with one or more systems on a chip (SoC), application specific integrated circuits (ASIC), discrete analog and digital circuits, and other circuitry.

The device processing circuitry 355, for example, may include one or more processors 360 and memory 365. The memory 365, for example, may store control instructions 366 that the processor 360 executes to carry out desired functionality for the mobile device 111 along with control parameters 367 that specify configuration and operating options for the control instructions 366. The memory 365 may also store any wireless data, Bluetooth data, cellular (e.g., 3G, 4G, LTE) data, or other data 368 that the mobile device 111 may send, or receive, through the communication interfaces 352, which may include Radio Frequency (RF) transmit (Tx) and receive (Rx) circuitry 353 capable of transmitting and receiving signals through one or more antennas 354. The memory 365 may also store application data 369 that can be executed to interface with the PPR system 100. The device processing circuitry, for example, may be capable of executing an application that presents a graphical user interface 310 to the customer 110 for interfacing with the PPR system 100.

As illustrated in FIG. 3, the graphical user interface 310 may display various product tiles 311 that represent products that the customer 110 has previously purchased from a product retailer 130. The user interface 310 may, for example, display product tiles 311 for each product in a virtual product inventory of a customer, which may be built and managed using the customer genome. The customer 110 may be able to select the individual product tiles 311 through the user interface 310 in order to list the corresponding product on the secondary market 135. The user interface 310 may also provide additional listing details 330 when the product tile 311 is selected, for example, in the form of a pop-up frame or bubble. The listing details 330 may include a suggested price field 331, which may be populated with a suggested price for listing the product on the secondary market 135, and may include a price adjustment element or field 332, which may allow the user to adjust the listing price for the selected product. The suggested price field 331 may suggest a value of the product in terms of currency or store credit, or a combination thereof, which may be determined based on price analytics of the secondary market 135. The listing details 330 may also include a push-to-market button 333 which the customer may select to automatically generate a product listing and place the product listing on the secondary market 135. The user interface 310 may also attach status indicators 315 to products that have been listed on the secondary market 135. In some implementations, the product retailer 130 may choose to provide the customer 110 with store credits for placing, or actually selling, a product on the secondary market 135, in order to promote use of the integrated secondary market 135 or promote future sales directly with the product retailer 130.

Figure 4:
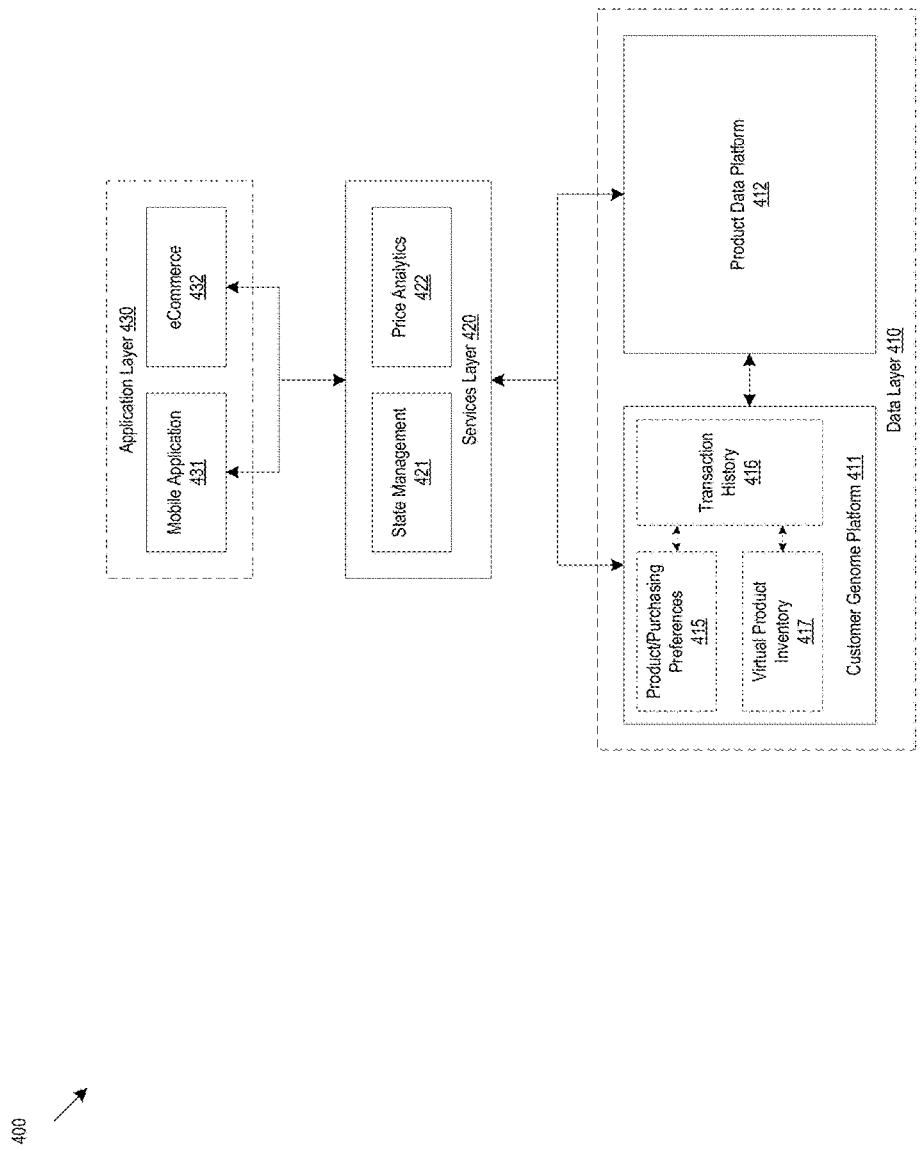

FIG. 4 illustrates an example of the system architecture 400 on which the PPR system 150 may be implemented. The system architecture 400 may include a PPR platform service layer 420 that may leverage a customer genome platform 411 and a product data platform 412 provided in the data layer 410, to enable functionality for mobile applications 431 and e-commerce platforms 432 at the application layer 430. The service layer 420 may provide state management 421 and price analytics 422 functionality, which may be exposed to the mobile applications 431 and e-commerce platforms 432 via an application programming interface (API). The API (e.g., a Representational State Transfer (REST) API) may define various function calls that the mobile applications 431 and e-commerce platforms 432 may invoke to request information from the service layer 420.

The product data platform 412 may be exposed within the data layer 410, and to the service layer 420 and application layer 430 via an API (e.g., a REST API), which may define various function calls which the PPR platform service layer 420 may invoke to request product information details. The product data platform 412 may include a database of information for products of the product retailer 130, which for example, may be used in generating product listings for the secondary market 135. The product data and retail taxonomy information (i.e., the relationship between UPC/barcode information and product details (e.g., color, size, etc.)) may enrich the product listings in a way that traditional secondary markets simply cannot.

The customer genome platform 411 may be exposed to the service layer 420 and application layer 430 via an API (e.g., a REST API), which may define various function calls which the service layer 420 and application layer 430 may invoke to request information regarding a particular customer 110 (or social influencer 120). For instance, as described above, the customer genome platform 411 may create a robust customer profile (or customer genome) for a customer 110, which may provide different preferences and characteristics for a given customer that may be derived from different data sources. By way of example, the customer genome may process the transactional history 416 of a customer 110 to build a virtual product inventory 417 (e.g., a virtual closet) of products that a customer 110 (or social influencer 120) has purchased from the product retailer 130. The customer genome may make use of the product data platform 412 in building the virtual product inventory 417, as it may provide additional details regarding a particular transaction. In some implementations, the customer genome may be updated in real time, for example, adding products to the virtual product inventory 417 as soon as they are purchased from the product retailer or from the secondary market 135. The PPR system 150 may utilize this virtual product inventory 417 to allow customers 110 (or social influencers 120) to conveniently sell previously purchased products on the secondary market, e.g., by using a mobile application, as described above.

The customer genome platform may also determine various customer product preferences and purchasing preferences 415 from the transactional history 416 (e.g., a size or style preference) of a customer. The customer genome may make use of the product data platform 412 in determining customer product preferences, as it may provide additional details regarding a particular transaction. For example, a particular transaction entry may only include a SKU and a purchase price. The product data platform 412 may be able to provide additional details regarding the product, for example, through associations between the SKU and product details (e.g., size, color, style, etc.). The customer genome may also process the transactional history 416 to determine purchasing preferences for a customer 110 (e.g., price sensitivity information, engagement channel preferences, etc.), which may be used to perform price analytics by the service layer 420. For example, the transactional history 416 of a customer may indicate that a customer often purchases products using gift cards or store credit, and the pricing analytics performed at the service layer 420 may account for this in providing a suggested price to the seller 110a (e.g., providing more store credit than actual currency).

Moreover, by capturing transactions on the secondary market 135, the product retailer may be able to build a richer profile of individual customers shopping behavior. Capturing a higher proportion of a customer's transactions (i.e., spending) and tracking this behavior over time, may lead to different insights for the product retailer. For example, by monitoring the listing of products, or sale of the products, on the secondary market 135, through the customer genome, a product retailer may be able to identify a demand for a particular product that is no longer in production or for a particular product price point, and adjust their merchandising strategy accordingly. For instance, a product retailer 130 may be compelled to bring back the product line if sufficient demand exists, or may develop a product line targeted towards a different price point.

The service layer 420 may manage the secondary market 135, and may track what products are listed for sale and which products have been sold. Further, as noted above, the PPR system 150 may build a virtual product inventory for a customer 110 or for a social influencer 120, and the service layer 420 may manage whether particular products in the virtual product inventory are listed on the secondary market 135. As noted above, the service layer 420 may provide state management of the secondary market 135, and may maintain state information regarding products in the virtual product inventory 417. The state information may include parameters indicating whether a product in the virtual product inventory 417 is listed on the secondary market 135 as well as the way the product is listed on the secondary market 135 (e.g., the listing price, listing date, etc.). When a listing expires, is removed, or the product is purchased, the service layer 420 may update the state of the product on the secondary market 135 and in the virtual product inventory 417 of the customer 110 (or social influencer 120).

The service layer 420 may also provide price analytics for products on the secondary market 135, which may look at the historical pricing of products on the secondary market 135 or from the product retailer 130, as well as the frequency at which products are listed and sold. The price analytics, for example, may use this information to model the secondary market 135 and provide suggested pricing information to product sellers 110*a* or social influencers 120. The price analytics may determine a suggested price for a particular product (e.g., based on the product SKU). By way of example, the suggested price may be calculated based on the retail price, which may be reduced based on the time since the purchase (e.g., days, months, years), a quality factor of the product, and any other discount factors. This information may be used to analyze trends within the secondary market to better understand customers, for example, to determine the effect that particular social influencers have on the sale of particular products.

In some implementations, the PPR system may model the demand for a particular product by looking at the number of similar products listed on the secondary market and analyzing the lists for the similar products. For instance, the PPR system may identify products that are listed, or have previously been listed, on the secondary market having similar product details (e.g., size, color and style), and may analyze the associated product listings (e.g., to determine a total number of listings, an average listing duration, an average listing price and an average sale price). The PPR system, in modelling the demand for a particular product, may also identify the potential customers who are participating in the secondary market, for example, by using the customer genome to identify customers with related product preferences (e.g., having a preference for products of that size, color and style), and look at the purchasing preferences of those customers (e.g., their price sensitivity) in determining the suggested price.

Figure 5:
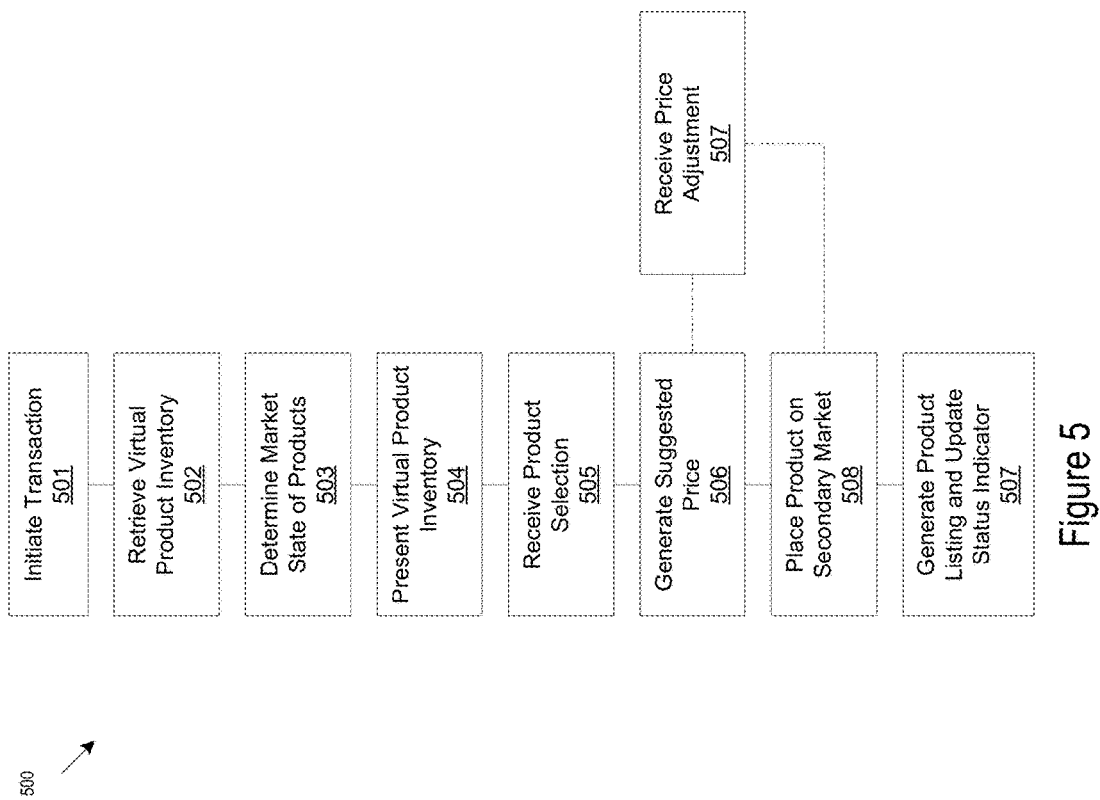
FIG. 5 illustrates a high-level logic flow that the PPR system may employ when servicing a mobile application request to interact with the secondary market.

FIG. 5 provides a high-level example of the logic that the PPR system may perform in facilitating a customer transaction in the secondary marketplace 135, where the customer is looking to make a product purchase, for example, using a mobile application 431, as described above. The PPR system 150 may receive a request to initiate a sales transaction (i.e., participate in the secondary market 135) (501). In response, the PPR system 150 may load the customer's virtual product inventory, which lists the products previously purchased by the customer 110 from the product retailer 130 (502). The PPR system may determine the market state (e.g., listed/unlisted or sold/unsold) of the products in the virtual product inventory (503), and present the virtual product inventory to the customer 110 (504). The customer 110 may select a particular product for placement on the secondary market (505). In response to the customer selection, the PPR system 150 may generate a suggested price for the listing (506), and may present the suggested price to the customer 110. In doing so, the PPR system 150 may retrieve product details associated with the particular product, including purchase history data (e.g., a purchase date and price). The customer 110 may optionally adjust the suggested price (507), and may then decide to place the product on the secondary market at the suggested price (or adjusted suggested price) (508). The PPR system 150 may generate a curated product listing for the product based on the product details and the suggested price (or adjusted suggested price), and may adjust the market state for the product and attach a status indicator to indicate that the product has been placed on the secondary market (509). Once placed on the market, the purchasing power of the customer may be adjusted (e.g., increased) in an amount corresponding to the suggested price (or adjusted suggested price).

Figure 6:
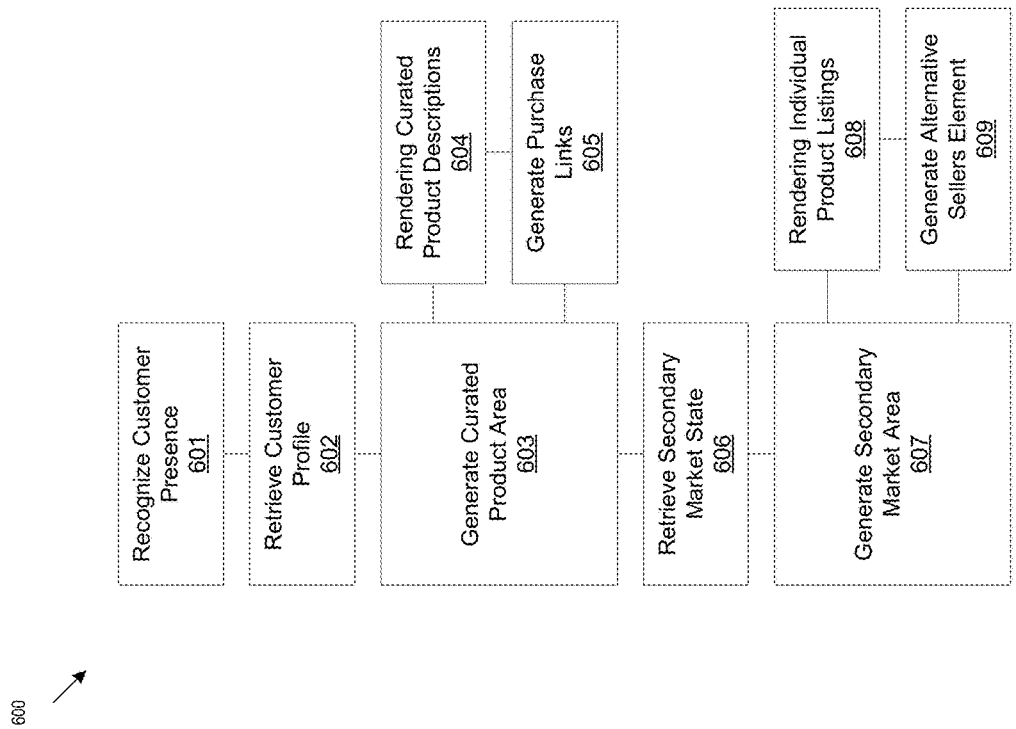
FIG. 6 illustrates a high-level logic flow that the PPR system may employ when integrating a secondary market within an e-commerce website.

FIG. 6 provides a high-level example of the logic that the PPR system may perform in integrating a secondary market into a product retailer website. The PPR system may automatically recognize a customer interacting with the website through a client device (e.g., a personal computer or smart phone) (601). In response, the PPR system may load the robust customer profile (i.e., the customer genome) of the customer (602). The PPR system may generate a product area for the website which may provide one or more curated product descriptions (i.e., a combined product listing) that may enable the customer to purchase one or more individual products featured in the curated product description (603). In some implementations, the curated product descriptions that are provided in the product area may be automatically identified using the customer genome, for example, by identifying one or more products within the curated product description having characteristics that correlate to customer product preferences that are stored in the customer genome. In other implementations, the PPR system may identify a social influencer that the customer is following, and may include curated product descriptions that are associated with the social influencer (e.g., curated product descriptions that the social influencer has designed). The curated product descriptions themselves may be rendered according to a pre-defined layout designed by a social influencer and/or the product retailer, and may include an image that presents the products in a visually appealing fashion along with relevant information regarding the products and a product listing of the different products included in the curated product description (604).

In addition, the PPR system may provide embedded links for each of the different products, which enable different purchasing options that the customer may be able to select (605). In doing so, the PPR system may determine whether a particular product is available directly from the product retailer or via the secondary market and whether similar products are available from the product retailer or via the secondary market, by matching product attributes of the particular product against the product retailer inventory and product listings on the secondary market. The PPR system may also generate a secondary market area for the website that may display products that are actively listed on the secondary market (607), and may retrieve a market state of the secondary market (606) including a set of products listed on the secondary market in order to do so. Individual product listings may be rendered in the secondary market area for products that are listed on the secondary market, where the individual product listings may include a product image, product name, listing price, which the customer interacting with the web site may select in order to purchase the product from the secondary market (608). In some implementations, the PPR system may also generate an alternative sellers element, which may present the customer with a link to product listings for the same (or similar) products that are available for sale from other sellers or directly from the product retailer, and may utilize the product data platform (609).

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

Various implementations have been specifically described. However, many other implementations are also possible and may be readily ascertained by a person of ordinary skill in the art based on the teachings described above. These implementations and equivalents thereof are illustrated by the examples described above and the scope of the invention should be determined not by the examples but with reference to the claims and equivalents appended hereto.

The invention claimed is:

1. A system for integrating a secondary market into a product retailer website, the system comprising a processor and a memory in communication with the processor, the memory having processor executable instructions stored thereon that when executed by the processor cause the processor to:
   automatically recognize a client device of a market participant interacting with the website;
   retrieve a robust customer profile for the market participant from the memory, the robust customer profile comprising social influencer preferences of the market participant;
   generate a product area on a webpage for the website, wherein to generate the product area the instructions cause the processor to:
      match the social influencer preferences of the market participant against a social influencer associated with a plurality of combined product listings;
      select a particular combined product listing from the combined product listings, the particular combined product listing comprising a set of individual products previously curated by the social influencer; and
      render the particular combined product listing, in the product area of the webpage, by rendering a combined product listing image, a combined product listing description, and a list of the set of individual products, where the combined product listing image and combined product listing description are rendered based on predefined criteria established by a product retailer,
   retrieve a market state of the secondary market from the memory, the market state including a set of product listings corresponding to products listed on the secondary market; and
   generate a secondary market area on the webpage based on the market state of the secondary market, wherein to generate the secondary market area the instructions cause the processor to:
      render, in the secondary market area of the webpage, one or more individual product listings from the set of product listings, by rendering an individual product image element and one or more additional informative elements for each of the one or more individual product listings, where each of the individual product image element and each of the one or more additional informative elements are selectable based on an input received from the client device to direct the client device to another webpage.

2. The system of claim 1, where the processor, in generating the product area on the webpage for the website based on the robust customer profile for the market participant, is further operable to:
   for each individual product in the set of individual products in the combined product listing:
   determine whether the individual product is available from the product retailer, and embed a product retailer purchase link in the product area when the product is available from the product retailer, the product retailer purchase link being selectable to add the individual product to a shopping cart;
   determine whether the individual product is available on the secondary market, embed a secondary market purchase link in the secondary market area when the product is available on the secondary market, the secondary market purchase link selectable to direct the client device to another webpage; and determine whether a similar product is available from the product retailer or on the secondary market when the product is not available from the product retailer or on the secondary market, and embed a similar product purchase link in the primary market area when the similar product is available by the product retailer or embed the similar product purchase link in the secondary market area when the similar product is available by the secondary market.

3. The system of claim 1 where the robust customer profile includes product attribute preferences of the market participant, and where the processor, in selecting the particular combined product listing, is operable to match the product attribute preferences of the market participant against one or more tags associated with each of the combined product listings.

4. The system of claim 2, where each individual product is characterized by product attributes and where the robust customer profile includes product attribute preferences of the market participant, where the processor, in determining whether the individual product is available from the product retailer, is operable to match the product attributes of the individual product and the product attribute preferences of the market participant against a product inventory of the product retailer;

where the processor, in determining whether the individual product is available on the secondary market, is operable to match the product attributes of the individual product against the set of product listings for products listed on the secondary market; and where the processor, in determining whether a similar product is available from the product retailer or on the secondary market, is operable to match the product attributes of the individual product against the product inventory of the product retailer and the one or more individual product listings on the secondary market.

5. The system of claim 1, where the processor, in rendering the individual product listing, is further operable to:

identify a related product listing in the set of product listings by matching the product corresponding to the individual product listing with the product corresponding to the related product listing using a product data platform of the product retailer, and render an alternative sellers element, where the alternative sellers element is selectable based on an input received from the client device to direct the client device to an alternative sellers webpage in which the related product listing is rendered.

6. The system of claim 1, where the processor, in generating the secondary market area on the webpage, is further operable to:

render, in the secondary market area of the webpage, a filter listings element, where the filter listings element is selectable based on an input received from the client device to:

identify a subset of product listings from the set of product listings; and render one or more individual product listings from the subset of product listings.

7. The system of claim 6, where the robust customer profile includes product attribute preferences of the market participant, and where the processor, in identifying the subset of individual product listings from the set of product listings, is operable to match the product attribute preferences of the market participant against the product attributes of the product corresponding to each product listing in the set of product listings.

8. A computer-implemented method of integrating a secondary market into a product retailer website, the method comprising:

automatically recognizing, at a server having a processor and a memory in communication with the processor, a client device of a market participant interacting with the website;

retrieving, from the memory, a robust customer profile for the market participant, the robust customer profile comprising social influencer preferences of the market participant;

generating a product area on a webpage for the website by:

matching the social influencer preferences of the market participant against a social influencer associated with a plurality of combined product listings;

selecting a particular combined product listing from the combined product listings, the particular combined product listing comprising a set of individual products previously curated by the social influencer; and rendering the particular combined product listing, in the product area of the webpage, by rendering a combined product listing image, a combined product listing description, and a list of the set of individual products, where the combined product listing image and combined product listing description are rendered based on predefined criteria established by a product retailer, retrieving a market state of the secondary market from the memory, the market state including a set of product listings corresponding to products listed on the secondary market; and generating a secondary market area on the webpage by the processor based on the market state of the secondary market, wherein generating the secondary market area comprises:

rendering, in the secondary market area of the webpage, one or more individual product listings from the set of product listings, by rendering an individual product image element and one or more additional informative elements for each of the one or more individual product listings, where each of the individual product image element and each of the one or more additional informative elements are selectable based on an input received from the client device to direct the client device to another webpage.

9. The method of claim 8, where generating the product area on the webpage for the website based on the robust customer profile for the market participant further comprises:

for each individual product in the set of individual products in the combined product listing:

determining whether the individual product is available from the product retailer, and generating a product retailer purchase link when the product is available from the product retailer;

determining whether the individual product is available on the secondary market, and generating a secondary market purchase link when the product is available on the secondary market; and determining whether a similar product is available from the product retailer or on the secondary market when the product is not available from the product retailer or on the secondary market, and generating a similar product purchase link when the similar product is available.

10. The method of claim 8, where the robust customer profile includes product attribute preferences of the market participant, and
   selecting the particular combined product listing comprises matching the product attribute preferences of the market participant against one or more tags associated with each of the combined product listings.

11. The method of claim 9, where each individual product is characterized by product attributes and where the robust customer profile includes product attribute preferences of the market participant,
   wherein determining whether the individual product is available from the product retailer comprises matching the product attributes of the individual product and the product attribute preferences of the market participant against a product inventory of the product retailer;
   wherein determining whether the individual product is available on the secondary market comprises matching the product attributes of the individual product against the set of product listings for products listed on the secondary market; and
   wherein determining whether a similar product is available from the product retailer or on the secondary market comprises matching the product attributes of the individual product against the product inventory of the product retailer and the one or more individual product listings on the secondary market.

12. The method of claim 8, where rendering the individual product listing further comprises:
   identifying a related product listing in the set of product listings by matching the product corresponding to the individual product listing with the product corresponding to the related product listing using a product data platform of the product retailer, and
   rendering an alternative sellers element, where the alternative sellers element is selectable based on an input received from the client device to direct the client device to an alternative sellers webpage in which the related product listing is rendered.

* * * * *